Patented Aug. 1, 1950

2,517,148

UNITED STATES PATENT OFFICE 2,517,148

BREWER'S SIRUP AND THE LIKE AND ITS MANUFACTURE

James F. Walsh, Holland, Mich., David M. Levitt, Great Neck, N. Y., and Abraham H. Goodman, Holland, Mich., assignors to Doughnut Corporation of America, New York, N. Y., a corporation of New York No Drawing. Application October 9, 1947, Serial No. 778,756

4 Claims. (Cl. 195—29)

This invention relates to brewer's syrups and the like and their manufacture, and among other objects aims to provide by a novel process an improved syrup suitable for use by brewers and for other purposes.

Another object of the invention is to provide a light colored brewer's syrup which has a substantially higher content of nutrients than possessed by light colored syrups heretofore available for brewing.

The nature of the invention may be readily understood by reference to one illustrative product and its method of manufacture described in the following specification.

In modern methods of making beer certain desirable qualities involving the presence of protein and other soluble nutrients have been sacrificed to obtain a beer of light color. A high content of protein and other nutrients in soluble form is, however, essential for beer of high quality and foam stability; and of course nutrients are essential for efficient and economical fermentation. We have discovered that it is possible, according to the present invention, to provide a brewer's syrup possessing these desirable properties without sacrifice of light color.

The manufacture of purified dextrose by acid hydrolysis of wheat starch results in the production of molasses having an unusually high D. E. (dextrose equivalent) and containing "solubilized" protein and other solubes which would make it much superior to other materials for brewing except for its tendency to crystallize or solidify and for a darker color than is desired for brewers. This molasses although much superior as regards dextrose content, to ordinary molasses, is practically limited in its market to that of ordinary molasses, i. e., for fermentation, cattle food and other low priced markets.

As explained in our co-pending applications, Serial 561,476 and 562,980, Patent No. 2,442,789, the wheat starch slurry used for conversion is that remaining after the mechanical separation of the gluten, and contains all solubles in the wheat flour (about 18%) and a residue of insoluble protein (i. e., gluten) which escapes separation. The resulting slurry thus contains all soluble nutrients in the flour, including 2 to 4% soluble and insoluble protein and 16 to 24% starch solids. The insoluble proteins are split or "solubilized" at an appropriate stage in the process so that they will remain with the liquid phase, with the result that all the aforesaid solubles and the soluble and "solubilized" proteins remain in the molasses. As stated above, these are very desirable not only in the final product but as nutrients during fermentation. The proteins have been split or "solubilized" to the point where they are not thrown out to cloud the beer on chilling, and thus are present to give the beer excellent foam stability and other desirable properties. However, though very desirable for brewing, the high dextrose content, (about 68 D. E.) of the molasses results in crystallization and solidification in shipping and storage containers, making it impracticable to handle in brewing; and its dark color (not desired for pale beers) cannot be lightened by practical means. Dilution to reduce the D. E. is impractical (quite aside from the problem of dark color) since the diluted molasses would then be in danger of fermentation.

We have discovered an economical and practical method for adapting and improving this molasses for brewing. We prepare a virgin syrup from the aforesaid unpurified starch slurry, but convert it by acid hydrolysis only to a D. E. of 30 to 40. This syrup is very light in color and contains a substantial amount of dextrins which add to the body of the final product. It also contains the insoluble and soluble proteins and other solubles above referred to. This syrup is then blended with the above described molasses in ratios varying from 40 to 60% molasses and 60 to 40% syrup, depending on purchasers specifications etc. Within these limits the final product as presently described will have a sufficiently low D. E. to inhibit crystallization.

Thereafter, the blended syrup is advantageously bleached, for example by allowing it to percolate through granular carbon which also acts as a filter. It is then concentrated to a heavy syrup (about 42 to 43 Bé.) which has a D. E. not less than 40 and not greater than 60.

At some stage in the process, and preferably before the aforesaid concentration, the blended syrup is treated with a proteolytic enzyme to split or "solubilize" the protein so that it will remain in the molasses and will not be thrown out on chilling of the beer. Preliminarily the syrup is cooled to a temperature (around 50 degrees C.) which will not destroy the enzyme; it is also preferably adjusted to the optimum temperature and pH for most efficient action of the enzyme. The optimum temperature and pH vary slightly for different enzymes, but in each instance these are known for each specific enzyme, and if most efficient action is desired, the adjustment appropriate for the enzyme used is made before introduction of the enzyme. Generally the pH is about 4 to 5.

The final blended syrup contains a substantially higher percentage (about 23 to 26%) of protein and other soluble nutrients than it is possible to obtain by conversion alone. Nevertheless it has the light color essential for beer, and its D. E. (40 to 60) is low enough to inhibit crystallization. It is thus vastly superior to materials heretofore available (within the limits of costs) for making beer.

Obviously the invention is not limited to the details of the illustrative methods, since these may be variously modified. Moreover, it is not indispensable that all features of the invention be used conjointly, since various features may be used to advantage in different combinations and sub-combinations.

Having described our invention, we claim:

1. A brewer's syrup comprising in combination a mixture of 25 to 75% molasses having a D. E. in excess of 60 and resulting from the acid conversion of a starch slurry formed from wheat flour after removal of crystallized dextrose, said slurry containing all the solubles in the wheat flour and 2 to 4% soluble and insoluble protein, and 75 to 25% of a virgin syrup resulting from the acid conversion of a like starch slurry to a D. E. of 30 to 40.

2. A brewer's syrup comprising in combination a mixture of wheat flour molasses having a D. E. in excess of 60, and a virgin syrup formed by the acid conversion of wheat flour to a D. E. of 30 to 40, said mixture containing 23 to 26% solubles from wheat flour including protein in soluble form.

3. The method of making a light colored brewer's syrup having a high protein and nutrient content which comprises forming a light colored virgin syrup, a wheat starch slurry containing all the solubles in wheat flour and about 2 to 4% soluble and insoluble protein, converting said slurry to a D. E. of 30 to 40, the said virgin slurry containing said solubles and protein, then blending the said syrup with a dark colored molasses, the latter being the residue remaining after the separation of crystallized dextrose from a similar wheat starch slurry converted to a D. E. in excess of 60 to form crystallized dextrose, the latter converted slurry having been treated with a proteolytic enzyme to split the protein so that the latter remains with the molasses after separation of the crystallized dextrose, the said molasses and virgin syrup being blended in the ratio of 40 to 60% molasses and 60 to 40% syrup, treating the blended syrup with a proteolytic enzyme to split the insoluble protein, and then filtering the blended syrup and concentrating the same to about 42 to 43° Bé.

4. The method of making a light colored brewer's syrup having a high protein and nutrient content which comprises producing molasses having a D. E. in excess of 60 by the acid conversion of a wheat starch slurry containing all the solubles in the wheat flour and 2 to 4% soluble and insoluble protein, treating the converted syrup with a proteolytic enzyme to split the protein so that the latter remains with the molasses after separation therefrom of crystallized dextrose, forming a light colored virgin syrup from a similar wheat starch slurry converted to a D. E. of 30 to 40 and containing all the solubles in the wheat flour and 2 to 4% soluble and insoluble protein, blending the said syrup with the aforesaid molasses in the ratio of about 40 to 60% molasses to 60 to 40% syrup, treating the blended syrup with a proteolytic enzyme to split the protein so that it will remain in the blended syrup after filtering, then filtering the blended syrup and concentrating the same.

JAMES F. WALSH.
D. M. LEVITT.
ABRAHAM H. GOODMAN.

REFERENCES CITED

The following references are of record in the file of this patent:

UNITED STATES PATENTS

| Number | Name | Date |
|---|---|---|
| 235,053 | Gassaway | Nov. 30, 1880 |
| 1,556,854 | Lenders et al. | Oct. 17, 1925 |
| 2,094,558 | Daley et al. | Sept. 28, 1933 |
| 2,096,549 | Jersey | Oct. 19, 1937 |
| 2,307,491 | Daley et al. | Jan. 5, 1943 |
| 2,307,725 | Daley et al. | Jan. 5, 1943 |

OTHER REFERENCES

Cereal Chemistry 13, 60 (1936), by Balls et al.
Starch and its Derivations by Radley, 2nd ed. (1944), page 169.
Starch by Eynon et al. (1928), pages 144–5.
Starch Making by Rekwald (1926), pages 145–150.